Sept. 28, 1926.

J. T. JANETTE

ROTOR CONSTRUCTION

Filed Jan. 18, 1926

1,601,122

Inventor
John T. Janette
By Glenn S. Noble
Atty.

Patented Sept. 28, 1926.

1,601,122

UNITED STATES PATENT OFFICE.

JOHN T. JANETTE, OF CHICAGO, ILLINOIS.

ROTOR CONSTRUCTION.

Application filed January 18, 1926. Serial No. 82,023.

This invention relates to rotors for alternating current electric motors and more particularly to the securing of the rotors on their shafts. Such rotors as commonly constructed comprise a plurality of laminations which are usually formed of steel or iron and are held together by end rings and longitudinal rivets or rotor bars. The end rings are usually made of copper and for various reasons, it is not desirable to have the rings extend in to engage with the shaft, or made in the form of disks; consequently, the rotor must be secured to the shaft through the laminations only. In the common forms of construction, the shafts are turned to provide a shoulder at one end of the rotor, and any suitable means may be used for holding the rotor against such shoulder or abutment. The provision of such a shoulder on the shaft necessitates using a larger shaft than necessary and then turning down the main portions thereof in order to leave such a shoulder or projection. This not only necessitates loss due to the cutting away of the shaft, but loss in labor, particularly when the shafts are finished by grinding. Furthermore, unless a fairly substantial shoulder is left on the shaft, the end laminations are apt to be pressed outwardly over the same, as the laminations are very thin and of comparatively soft metal.

The present invention relates to means for providing a suitable abutment on the shaft against which the rotor may be pressed and means for holding the parts in adjusted position in order to provide for a satisfactory support for the rotor on the shaft which will overcome the objections above noted.

The objects of this invention are to provide an improved means for securing a rotor to a shaft; to provide an improved rotor construction whereby substantially the full diameter of the shaft may be used without cutting away the shaft to provide a shoulder; to provide a shaft with a split ring and means on the rotor for holding the ring in position; to provide a rotor with its outermost lamination having a flange for holding the locking ring in position; and to provide such other novel features or improvements in construction as will appear from the following description.

In the accompanying drawings illustrating this invention,

Figure 1:
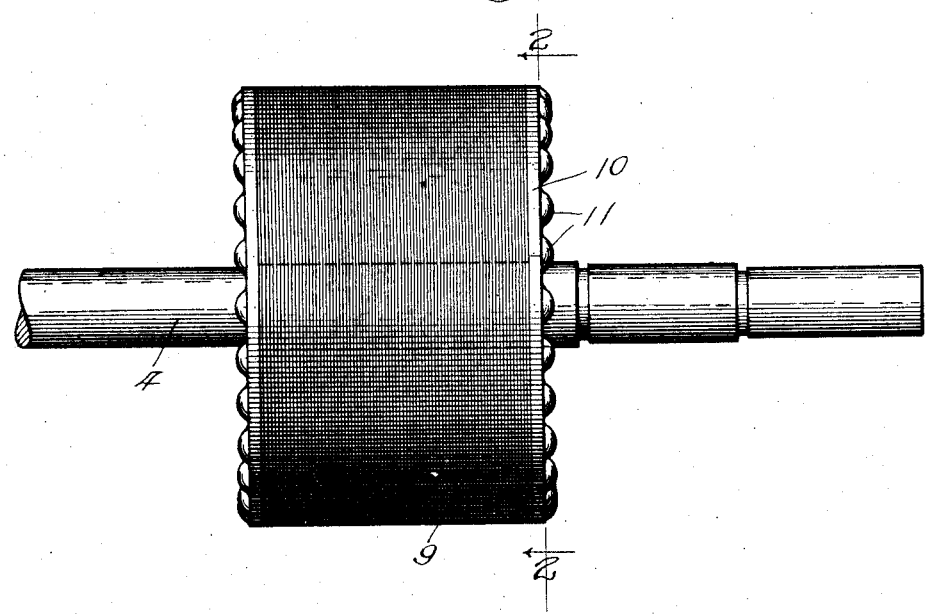
Figure 1, is a side view of the rotor and shaft.
Figure 2:
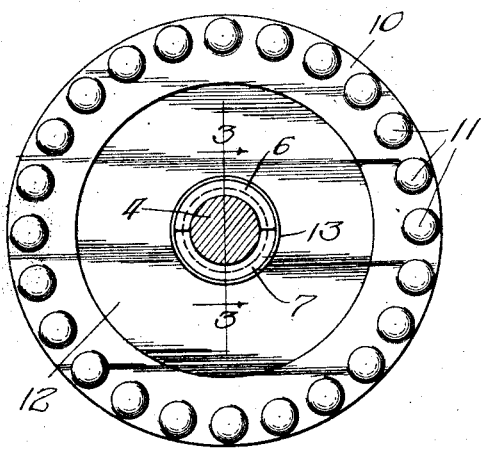
Figure 2 is a sectional view taken on the line 2—2 of Figure 1.
Figure 3:
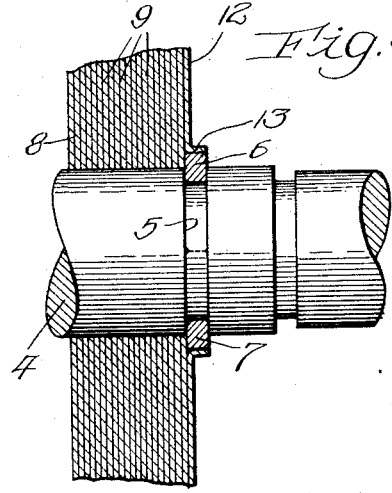
Figure 3 is an enlarged detail sectional view taken on the line 3—3 of Figure 2.

As shown in these drawings, the main portion of the shaft 4 upon which the rotor is mounted, is of uniform diameter and is provided with the usual turned or ground, journal or bearing portions. The shaft is provided with a peripheral groove 5 adjacent to the end of the main or enlarged portion thereof for receiving a ring 6. For convenience in construction and assembling, this ring is split and projects outwardly a sufficient distance from the shaft to form a substantial abutment 7. The rotor 8 fits closely on the shaft 4 and may be secured thereto by means of any suitable key or similar arrangement (not shown) for causing it to rotate with the shaft. The rotor laminations 9 are held together by means of the rings 10 and bars 11. The end lamination 12 is provided with an outwardly projecting annular flange 13 which fits closely over the ring or collar 6.

When the parts are to be assembled, the ring 6 is placed in the groove 5 and the rotor is then pressed onto the shaft until it engages with the abutment 7, and the flange 13 passing over the ring will hold the parts securely in position. Any suitable arrangement (not shown) may be used for holding the rotor in position against the ring. It will be readily seen that by means of this arrangement it is not necessary to turn the shaft down to make a shoulder, and furthermore, when the main portion of the shaft is being ground, the grinder may be passed the full length of the main portion of the shaft, which greatly facilitates the grinding operation.

Changes may be made in the details of construction or arrangement of the parts in order to adapt the device for different conditions, and therefore I do not wish to be limited to the exact arrangement herein shown and described, except as specified in the following claims, in which I claim:

1. In a rotor construction, the combination of a shaft having its main portions of substantially uniform diameter with a peripheral groove therein, a split ring fitting in said groove, and projecting beyond the shaft to form an abutment, a rotor having a plurality of laminations and engaging with said shaft, and a projection on one of the rotor laminations for holding the ring in position.

2. The combination of a motor shaft having an annular groove therein, a split ring fitting in said groove and projecting beyond the shaft, a rotor having a plurality of laminations and engaging with said shaft, the end lamination of the rotor having an annular flange projecting outwardly and fitting over the ring.

3. In a rotor construction, the combination of a shaft having a slot therein, an abutment fitting in said slot, a rotor having a plurality of laminations and engaging with said shaft and a projection on one of the end laminations for engagement with the abutment to lock it in position on the shaft.

4. The combination of a shaft having an annular groove therein, an abutment ring formed of two parts and fitting in said groove, a rotor having a plurality of laminations fitting on said shaft and adapted to be pressed against the ring, the outer lamination being provided with a flange for engagement with the ring for holding the same in the groove.

JOHN T. JANETTE.